United States Patent [19]
Raleigh

[11] 4,159,126
[45] Jun. 26, 1979

[54] MODEL RACING CAR HAVING AN IMPROVED REAR WHEEL SUSPENSION

[76] Inventor: Roger W. Raleigh, 530 Alsace Lorraine, Half Moon Bay, Calif. 94109

[21] Appl. No.: 851,120

[22] Filed: Nov. 14, 1977

[51] Int. Cl.² ............................................. B60G 11/00
[52] U.S. Cl. .................................... 280/688; 46/251; 180/64 M
[58] Field of Search ................. 280/688, 788; 180/60, 180/62, 64 R, 64 M, 63, 56; 46/251–256

[56] References Cited

U.S. PATENT DOCUMENTS

| | | | |
|---|---|---|---|
| 804,884 | 11/1905 | Rutan | 180/64 M |
| 3,501,863 | 3/1970 | Matsushiro | 46/251 |
| 3,751,065 | 8/1973 | Sullivan | 46/251 |
| 3,752,246 | 8/1973 | Sullivan | 180/56 |

*Primary Examiner*—Robert R. Song

*Attorney, Agent, or Firm*—Harry E. Aine; Harvey G. Lowhurst

[57] ABSTRACT

In a rear wheel suspension system for a model racing car, the motor, rear axle and rear wheels are all supported from a supporting platform which is spring mounted to the chassis via the intermediary of a pair of springs, preferably coil springs, disposed in laterally spaced positions on opposite sides of the longitudinal center line of the chassis. A third point of attachment between the supporting platform and the chassis is provided at a point longitudinally spaced from the pair of mounting springs. The suspension system is so arranged as to permit a relative twisting action between the mounting platform and the main portion of the chassis so as to permit twisting or rotation of the supporting platform about both the longitudinal axis of the chassis and an axis transverse to the chassis, whereby independent suspension of the wheels is obtained relative to the chassis for improved stability and traction.

11 Claims, 8 Drawing Figures

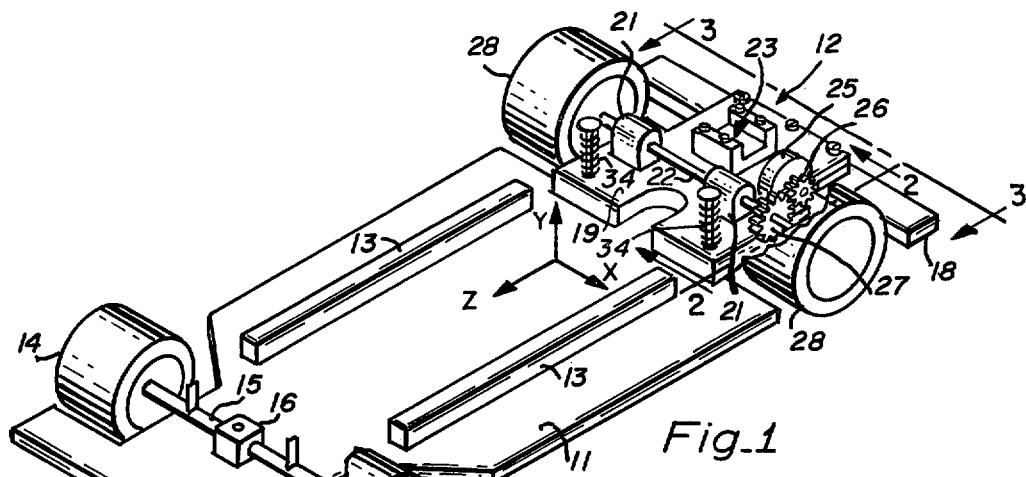
Fig_1
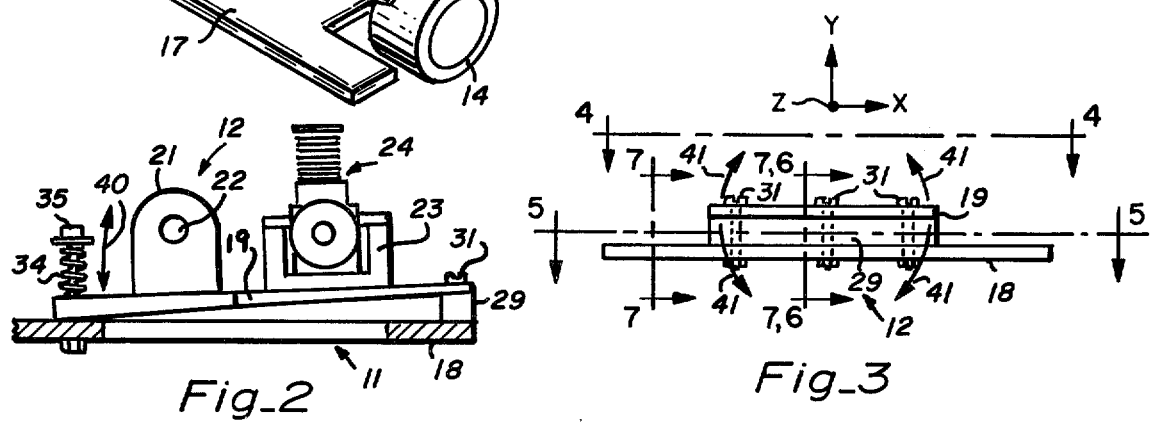
Fig_2   Fig_3
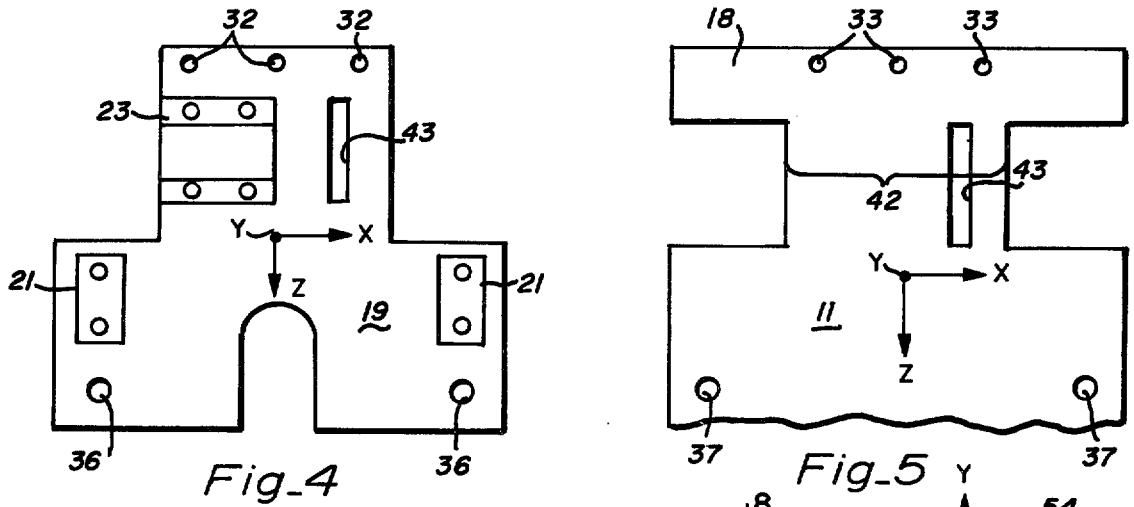
Fig_4   Fig_5
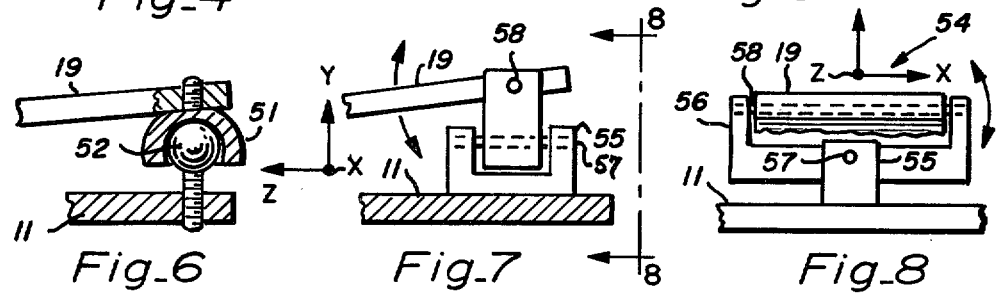
Fig_6   Fig_7   Fig_8

MODEL RACING CAR HAVING AN IMPROVED REAR WHEEL SUSPENSION

BACKGROUND OF THE INVENTION

The present invention relates in general to model racing cars and, more particularly, to an improved rear wheel suspension system for a model racing car.

DESCRIPTION OF THE PRIOR ART

Heretofore, rear suspensions for model racing cars have been proposed wherein the motor, rear axle and wheels were all mounted to a flexible portion of the chassis so as to permit independent suspension of the wheels relative to the chassis. This type of suspension improves the steering stability and traction for the model racing car, which is particularly advantageous in radio controlled racing cars. Such cars typically are one-twelfth or one-eighth scale versions of actual racing cars and attain racing speeds between 40 and 70 miles per hour. A prior art rear wheel suspension system is disclosed in U.S. Pat. No. 3,752,246 issued Aug. 14, 1973, see particularly FIG. 5 thereof.

One of the disadvantages of the aforecited prior art rear wheel suspension system was that the twisting of the rear wheels about an axis extending longitudinally of the chassis was obtained due to a twisting deflection of a portion of the chassis. When the chassis is flexed with a twisting motion this produces undesired affects on the steering of the car. These difficulties in steering, when the car is traveling at racing speeds, make it virtually impossible for a novice to properly control and steer the car. Also, the car displays erratic behavior in high speed turns and quick turns. Therefore, it is desired to obtain a rear wheel suspension system which will permit a relatively independent suspension of the rear wheels without introducing undesired steering affects.

SUMMARY OF THE PRESENT INVENTION

The principal object of the present invention is the provision of an improved rear wheel suspension system for model racing cars.

In one feature of the present invention, the rear wheels, and motor are mounted to the chassis via the intermediary of a supporting platform which is spring mounted to the chassis via the intermediary of a pair of laterally spaced springs and further mounted to the chassis at a third mounting point, longitudinally spaced from the aforementioned pair of springs, so as to permit twisting of the mounting platform about a pair of generally orthogonal axes, one of the axes being transverse to the longitudinal axis of the chassis and the other axis extending generally longitudinally of the chassis, whereby improved steering stability is obtained.

In another feature of the present invention, the longitudinally spaced third mounting point includes a universal or ball joint coupler disposed near the longitudinal center line of the chassis to facilitate twisting of the mounting platform about both the longitudinal and transverse axes of rotation for the mounting platform relative to the chassis.

In another feature of the present invention, lateral restraints are provided for restraining lateral translation of the mounting platform relative to the chassis for improving the tracking and steering stability of the car.

Other features and advantages of the present invention will become apparent upon a perusal of the following specification taken in connection with the accompanying drawings, wherein:

BRIEF DESCRIPTION OF THE DRAWINGS

FIG. 1 is a perspective view of a model racing car chassis including the rear wheel suspension system of the present invention, FIG. 2 is a longitudinal sectional view of a portion of the structure of FIG. 1 taken along line 2—2 in the direction of the arrows, FIG. 3 is an end view of the structure of FIG. 1 taken along line 3—3 in the direction of the arrows, FIG. 4 is a plan view of a portion of the structure of FIG. 3 taken along line 4—4 in the direction of the arrows, FIG. 5 is a plan view of a portion of the structure of FIG. 3 taken along line 5—5 in the direction of the arrows, FIG. 6 is a longitudinal sectional view of a portion of the structure of FIG. 3 taken along line 6—6 in the direction of the arrows and depicting an alternative mounting structure of the present invention, FIG. 7 is a view similar to that of FIG. 6 depicting another alternative embodiment of the present invention, and FIG. 8 is an end view of the structure of FIG. 7 taken along line 8—8 in the direction of the arrows.

DESCRIPTION OF THE PREFERRED EMBODIMENTS

Referring now to FIGS. 1-5 there is shown a chassis 11 of a model racing car incorporating a rear wheel suspension system 12 of the present invention. The chassis 11 comprises a sheet metal member, as of 0.050 inch thick 7075 aluminum alloy, having a width of approximately 5.25 inches and an overall length of approximately 12.25 inches, for the one-twelfth scale model. A pair of reinforcing rails 13 run longitudinally of the chassis, i.e., in the Z direction for reinforcing the chassis and to receive the radio control equipment, not shown.

The front wheels 14 are carried from an axle 15 which is pivotably mounted to the chassis 11 at 16 and the radio controlled servo mechanism for steering is coupled to the pivotable axle 15 for steering of the car. The chassis 11 is cut away adjacent to each of the wheels to provide a bumper structure 17 and 18 at the front and rear of the car, respectively.

The rear suspension system 12 includes a supporting platform 19 which, in one embodiment, has a wedge-shaped longitudinal cross section so as to be thicker at the front end thereof than at the rear end. In a typical example, the mounting platform 19 is made of 7075 alloy aluminum and has a thickness as of 0.250 inch at the front tapering uniformly to a thickness of 0.062 inch at the rear. In a typical example, the platform 19 has an overall length of approximately 2.75 inches and a maximum width of approximately 3.00 inches. At the thin end, the mounting platform 19 is reduced in width to accommodate the rear wheels and to further facilitate twisting of the platform 19 about the longitudinal centerline or Z axis.

A pair of rear axle mounting blocks 21 are affixed at laterally spaced positions to the mounting platform (19) and an engine mounting block 23 is affixed to the platform 19 for mounting the engine 24 to the platform 19. The output shaft of the engine 24 is coupled to a fly wheel 25. A pinion gear is carried from the fly wheel.

The pinion gear engages a drive gear 27 carried from the rear axle 22 for driving the rear wheels 28.

The rear lip of the mounting platform 19 is coupled to the chassis 11 via the intermediary of a pivot block 29. A plurality of screws 31 pass through aligned bores 32 in the mounting platform 19 and terminate in taped bores 33 in the rear lip or bumper portion 18 of the chassis 11. The forward end of the mounting platform 19 is spring-mounted to the chassis 11 via a pair of laterally spaced coil springs 34 coaxially mounted on cap screws 35 (see FIG. 2) passing through aligned bores 36 (see FIG. 4) in the mounting platform 19 and terminating in taped bores 37 (see FIG. 5) in the chassis 11. The coil springs 34 each have an axis of maximum compliance directed generally vertically of the chassis 11 so as to permit pivotable rotation of the mounting platform 19 as shown by arrow 40 (FIG. 2) about a transverse axis of revolution generally parallel to the X axis, i.e., a transverse to the longitudinal axis of the chassis 11. The transverse axis of rotation (X axis) falls generally in the pivot block 29 and permits the rear wheels to move vertically relative to the chassis 11. The coil springs 34 serve as a shock absorbing mount for absorbing shocks transmitted vertically upwardly from the rear wheels 28 to the platform 19.

Also, the coil springs 34, due to their lateral displacement relative to the centerline Z axis, permit the mounting platform 19 to twist or rotate about an axis of rotation extending generally parallel to the Z axis, as shown by the arrows 41 of FIG. 3. In this embodiment, torsional flexure of both the flexible resilient mounting platform 19 and the necked down region of the flexible resilient chassis at 42 contribute to the torsional deflection, i.e., twisting rotation of the rear suspension system about the Z axis of rotation. Flexure is not transmitted into the forward portion of the chassis because of the reinforcements 13 and the radio and control means when mounted. Both the mounting platform 19 and chassis 11 are apertured at 43 to accommodate the fly wheel 25.

Referring now to FIG. 6 there is shown an alternative embodiment of the rear suspension system, incorporating features of the present invention. More particularly, the suspension system of FIG. 6 is essentially the same as that previously described with regard to FIGS. 1-5, with the exception that both the chassis structure 11 and the mounting platform 19 are of sufficient rigidity to resist torsional flexure about the longitudinal or Z axis. In this case, a ball joint 51 replaces the pivot block 29, such ball joint 59 being mounted generally on the longitudinal centerline of the chassis 11 and of the mounting platform 10. The ball joint 51 provides relative rotational translation of the mountain platform 19 relative to the rigid chassis 11 about an axis generally parallel to the Z axis as an axis of revolution. It also permits rotational translation of the mounting platform 19 about the X axis, passing through the center of the ball platform 52 of the ball joint.

Relative lateral translation between the mounting platform 19 and the chassis 11 is restrained by means of the cap screws 35 (see FIGS. 2 and 4). The cap screws serve as guideposts cooperating with the inner lip of bores 36 in the mounting plate 19. Such bores 36 being dimensioned relative to the transverse dimensions of the cap screws 35 so as to permit twisting of the platform 19 about the Z axis of revolution while at the same time restraining excessive lateral translation of the mounting platform 19 relative to the chassis 11. The rear wheel suspension embodiment of FIG. 6 has an advantage over the torsional flexure function of the suspension system of FIGS. 1-5 in that chassis 11 is not deformed due to torisonal forces transmitted to the mounting plate from the rear wheels.

Referring now to FIGS. 7 and 8 there is shown an alternative embodiment of the rear suspension system of the present invention. In the embodiment of FIGS. 7 and 8, pivot block 29 of the suspension system of FIGS. 1-5 and the ball joint mount of the embodiment of FIG. 6 is replaced by a universal joint 54. The universal joint 54 includes a U-shaped bracket 55 fixedly secured to the rigid chassis 11. A yoke 56 is pivotably affixed to the bracket 55 via the intermediary of a pivot pin 57 passing through the center of the yoke 56. The mounting platform 19 is pivotably secured to the yoke 56 via a pivot pin 58 passing through a fork of the yoke 56 generally in the transverse or X direction. The universal joint 54 permits the mounting platform 19 to pivot about both the X and Z axes at the joint 54 relative to the chassis 11 so that the rear wheels may move independently of the chassis 11 for increased steering stability. By controlling the tolerance between the width of the inside of the yoke 56 and the outer side edges of the mounting platform 19 at the universal joint 54, undesired lateral translation between the mounting platform 19 and the chassis 11 is controlled.

The aforecited X and Z axes of rotation of the mounting platform 19 are generally parallel to the transverse and longitudinal centerline, respectively, of the chassis. It is contemplated that departure from precise parallelism can be tolerated, i.e., up to as much as 30°.

The advantage to the rear wheel suspension system of the present invention is that it permits independent movement of the rear wheels relative to the chassis and allows for independent adjustment of the spring mounting of the rear wheels relative to the chassis by adjustment of cap screws 35, whereby improved steering control is achieved under racing conditions. Such racing cars, for the one-twelfth scale models, weigh between 2 and 4 pounds and typically use a 0.049 cubic inch displacement engine to attain speeds of between 40 and 45 miles per hour, whereas the one-eighth scale models weigh between 8 and 11 pounds, employ a 0.20 cubic inch displacement engine and travel at speeds up to 70 miles per hour. These cars are typically run on asphalt parking lots, except that certain models employ electric motors and are driven on a rugged floor, asphalt surface, or other such surface.

What is claimed is:

1. In a model racing car rear wheel suspension system for suspending the motor and rear wheels from an elongated chassis;

supporting means for supporting a motor, rear axle, and rear wheels all for spring mounting to the chassis of the model racing car;

first and second spring mounting means for spring mounting of said supporting means to such chassis in a shock absorbing manner at first and second mounting points located respectively on opposite lateral sides of the longitudinal centerline of said chassis to permit said supporting means, motor, axle and rear wheels to move independently of said chassis;

third mounting means for mounting said supporting means to the chassis at a point longitudinally spaced of said first and second mounting points; and twistable means operatively associated with said supporting means for permitting twisting of said supporting means about an axis of revolution extending longitudinally of said elongated chassis.

2. The apparatus of claim 1 wherein said twistable means comprises a flexible resilient portion of said supporting means which provides the aforesaid twisting of said supporting means by twisting of said resilient portion of said supporting means in response to torsional forces exerted onto said supporting means via the intermediary of said wheels and axle.

3. The apparatus of claim 1 wherein said twistable means comprises a flexible resilient portion of said chassis which provides the aforesaid twisting of said supporting means by twisting of said flexible resilient portion of said chassis in response to torsional forces exerted onto said supporting means through the intermediary of said wheels and axle and thence via said third mounting means into said flexible resilient portion of said chassis.

4. The apparatus of claim 1 wherein said first and second spring mounting means each has an axis of maximum compliance extending generally vertically.

5. The apparatus of claim 4 including means for restraining lateral movement of said supporting means relative to said chassis.

6. The apparatus of claim 1 wherein said third mounting means includes a ball joint for coupling said supporting means to said chassis and which also functions as said twistable means.

7. The apparatus of claim 1 wherein said third mounting means includes a joint for coupling said supporting means to said chassis and which also functions as said twistable means.

8. The apparatus of claim 1 wherein said third mounting means and said twistable means includes a coupling means for coupling said supporting means to said chassis and for providing relative rotational movement between said chassis means and said supporting means about a pair of axes of revolution, one of said axes of revolution being generally transverse to the longitudinal axis of the chassis and the other axis of revolution extending generally in the direction of the longitudinal axis of the chassis.

9. The apparatus of claim 8 including means for providing restraint against relative lateral movement between said supporting means and the chassis.

10. The apparatus of claim 8 wherein said first and second spring mounting means includes a pair of coil springs mounted with their axes of maximum compliance extending generally vertically.

11. The apparatus of claim 1 wherein said third mounting means is coupled to said chassis means at a point laterally closer to the longitudinal centerline of the chassis than the average lateral spacing of said first and second spring mounting means from said longitudinal centerline of said chassis.

* * * * *

REEXAMINATION CERTIFICATE (2768th)

United States Patent [19]

Raleigh

[11] B1 4,159,126

[45] Certificate Issued Jan. 9, 1996

[54] MODEL RACING CAR HAVING AN IMPROVED REAR WHEEL SUSPENSION

[76] Inventor: Roger W. Raleigh, 530 Alsace Lorraine, Half Moon Bay, Calif. 94109

Reexamination Requests:
No. 90/003,038, Apr. 30, 1993
No. 90/003,644, Nov. 25, 1994

Reexamination Certificate for:
Patent No.: 4,159,126
Issued: Jun. 26, 1979
Appl. No.: 851,120
Filed: Nov. 14, 1977

[51] Int. Cl.$^6$ .................................................. B60G 11/00
[52] U.S. Cl. .......................... 280/688; 446/462; 180/67; 180/60
[58] Field of Search ................... 180/58, 60, 56, 180/11, 12, 62, 64, 299; 446/462; 280/688, 788

[56] References Cited

U.S. PATENT DOCUMENTS 2,209,457  7/1940  Hare .
3,115,945  12/1963  Dry .

FOREIGN PATENT DOCUMENTS 998406  9/1951  France .

*Primary Examiner*—Joseph D. Pape

[57] ABSTRACT

In a rear wheel suspension system for a model racing car, the motor, rear axle and rear wheels are all supported from a supporting platform which is spring, mounted to the chassis via the intermediary of a pair of springs, preferably coil springs, disposed in laterally spaced positions on opposite sides of the longitudinal center line of the chassis. A third point of attachment between the supporting platform and the chassis is provided at a point longitudinally spaced from the pair of mounting springs. The suspension system is so arranged as to permit a relative twisting action between the mounting platform and the main portion of the chassis so as to permit twisting or rotation of the supporting platform about both the longitudinal axis of the chassis and an axis transverse to the chassis, whereby independent suspension of the wheels is obtained relative to the chassis for improved stability and traction.

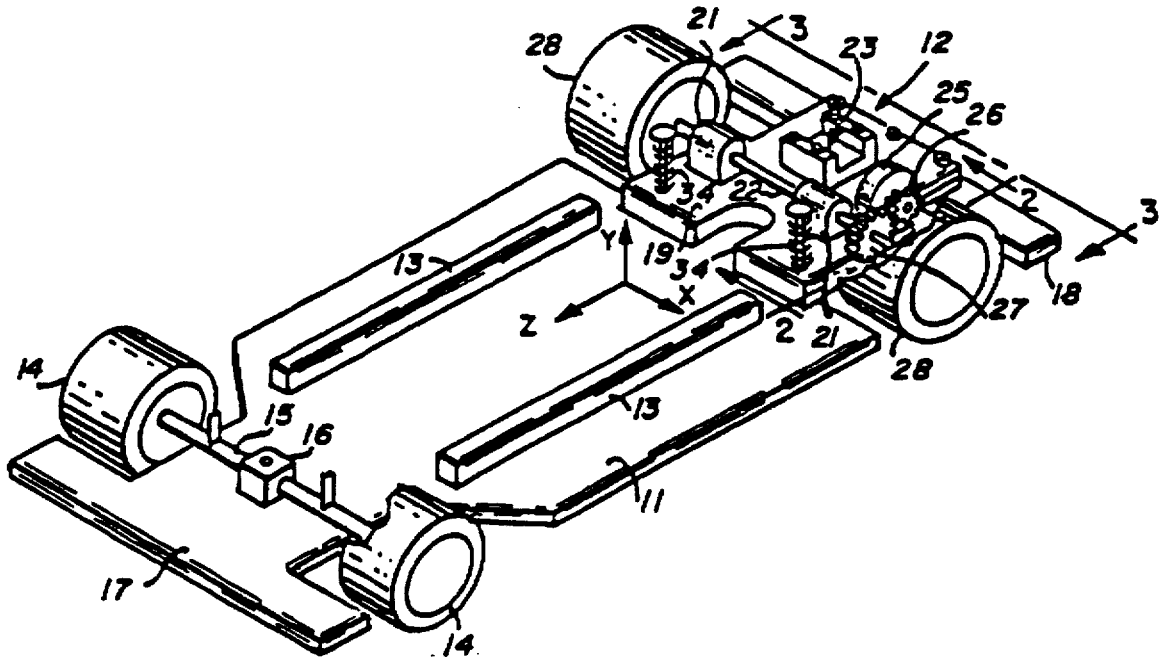

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2, 3, 5 and 9 is confirmed.

Claims 1, 4 and 8 are cancelled.

Claims 6–7 and 10–11 are determined to be patentable as amended.

New claims 12–14 are added and determined to be patentable.

6. The apparatus of claim [1] *5* wherein said third mounting means includes a ball joint for coupling said supporting means to said chassis and which also functions as said twistable means.

7. The apparatus of claim [1] *5* wherein said third mounting means includes a joint for coupling said supporting means to said chassis and which also functions as said twistable means.

10. The apparatus of claim [8] *9* wherein said first and second spring mounting means includes a pair of coil springs mounted with their axes of maximum compliance extending generally vertically.

11. The apparatus of claim [1] *5* wherein said third mounting means is coupled to said chassis means at a point laterally closer to the longitudinal centerline of the chassis than the average lateral spacing of said first and second spring mounting means from said longitudinal centerline of said chassis.

*12. In a model racing car wheel suspension system for suspending the motor and wheels from an elongated chassis:*

*a single support for supporting a motor, a rear axle and a pair of rear wheels mounted to said axle all for spring mounting to the chassis of said model racing car;*

*first and second coil springs for spring mounting of said support to said chassis in a shock absorbing manner at first and second mounting points located respectively on opposite lateral sides of a longitudinal centerline of said chassis and adjacent said rear axle to permit said support, motor, axle and wheels to move independently of said chassis;*

*said spring having opposite ends bearing against said chassis and said support, respectively;*

*mounting means for mounting said support to said chassis at a point longitudinally spaced relative to said first and second coil springs and adjacent said rear axle; and*

*twistable means operatively associated with said support for permitting twisting of said support about an axis of revolution extending longitudinally of said elongated chassis,*

*said first and second coil springs each having an axis of maximum compliance extending generally vertically and which further comprises means associated with said springs for restraining lateral movement of said support relative to said chassis.*

*13. The apparatus of claim 12 in which said mounting means comprises a ball and socket for coupling said support to said chassis and which also functions as said twistable means.*

*14. The apparatus of claim 12 in which said twistable means comprises a yoke extending transversely of said chassis, a first pivot pivotally mounting said yoke to said chassis and a second pivot pivotally mounting said yoke to said support, whereby said support may pivot about a pair of horizontal axes of revolution, one said axis of revolution being generally transverse to the longitudinal axis of said chassis and the other said axis of revolution extending generally in the direction of the longitudinal axis of said chassis.*

* * * * *